United States Patent Office 3,155,584
Patented Nov. 3, 1964

3,155,584
COMPOSITIONS AND METHOD OF INHIBITING MONOAMINE OXIDASE AND TREATING HYPERTENSION
William B. Martin, Waukegan, Ill., assignor to Abbott Laboratories, North Chicago, Ill., a corporation of Illinois
No Drawing. Filed Dec. 3, 1962, Ser. No. 241,485
8 Claims. (Cl. 167—65)

This invention relates to compositions and a method of employing such compositions for inhibiting the action of the enzyme monoamine oxidase as well as counteracting hypertension in warm blooded animals. More particularly, it relates to pharmaceutical compositions and a method of inhibiting monoamine oxidase or reducing hypertension by the administration of N-propargylbenzylamine or N-methyl-N-propargylbenzylamine and their pharmaceutically acceptable, non-toxic, acid-addition salts orally, intravenously, or intraperitoneally to warm blooded animals.

It has been demonstrated that modern drugs such as iproniazid antagonize other substances present in the body of warm blooded animals such as serotonin and beta-3,4-dihydroxyphenylalanine (hereinafter referred to as DOPA). Such antagonism has a profound effect upon the temperament and well-being of the animal. It has also been observed that serotonin and DOPA are destroyed by the enzyme monoamine oxidase in the brain and elsewhere in the body. Although the beneficial effects of a monoamine oxidase inhibitor are not completely understood, it is believed that by inhibiting the activity of this enzyme, a larger amount of serotonin, DOPA and other catechol amines are free to act, thus improving or completely eliminating the annoying symptom of depression.

DOPA has been shown to form DOPA amine which in turn forms epinephrine and norepinephrine. In a normal mouse, a dose of 200 mg. of DOPA per kilogram of body weight produces only piloerection and no remarkable central action. This is due to the rapid destruction of DOPA and other catechol amines by monoamine oxidase. If this enzyme is inhibited, these substances are only slowly destroyed and accumulate in sufficient concentrations centrally to produce a striking increase in excitement, running activity, fighting and jumping in treated mice. The untreated white laboratory mouse does not normally exhibit such behavior. Tests have shown a good correlation between the degree of monoamine oxidase inhibition as determined in the livers and brains of similarly treated mice with the degree of increased activity and aggressiveness observed after giving DOPA.

This invention is based upon the discovery that the foregoing mentioned amines or their non-toxic, acid-addition salts and particularly the corresponding hydrochlorides will inhibit the action of the enzyme monoamine oxidase as well as counteract hypertension in warm blooded animals in vivo when employed in sufficient non-toxic doses. It has been found that doses of from 5 to 200 mg. of these amine acid-addition salts may be employed per kilogram of body weight to obtain a remarkable inhibition of monoamine oxidase enzyme or to reduce blood pressure in warm blooded animals. Correspondingly lower doses of the amines themselves may be employed if desired with equally effective results since the amines per se are the active inhibitor.

The amines employed in the method of the present invention may be prepared as described in the following examples:

EXAMPLE 1

*N-Propargylbenzylamine*

Propargyl bromide (29.7 grams, 0.25 mole), benzylamine (80.4 grams, 0.75 mole) and 350 ml. of absolute ethanol were mixed and a mild exothermic reaction began immediately. This reaction continued for about one hour during which time the temperature of the reactive mixture increased to a maximum of 50° C. The resulting mixture was then allowed to stand at room temperature for 22 hours and thereafter heated at the boiling temperature and under reflux for one hour. The alcohol was removed by vacuum distillation and the residue made alkaline with an aqueous solution of potassium hydroxide. The oil layer which formed was separated, washed with water and extracted with three portions of ether. The ethereal extract was dried over magnesium sulfate and fractionally distilled under reduced pressure to obtain the desired N-propargylbenzylamine which boiled at 101–103° C. at 8 mm. pressure. This compound was converted to the hydrochloride salt by treating an ethereal solution of said compound with an ethereal solution of hydrogen chloride. The white, solid, hydrochloride salt which precipitated was recrystallized from ethyl alcohol and found to melt at 197–198° C. Analysis calculated for $C_{10}H_{12}ClN$: C=66.10%; H=6.64%; N=7.71%. Found: C=66.11%; H=6.62%; N=7.57%.

EXAMPLE 2

*N-Methyl-N-Propargylbenzylamine*

A mixture of 23.8 grams (0.2 mole) of propargyl bromide, 24.2 grams (0.2 mole) of N-methyl benzylamine and 400 ml. of anhydrous ethanol in the presence of 42.4 grams (0.4 mole) of anhydrous sodium carbonate was heated at the boiling temperature and under reflux for a period of 17 hours. The sodium carbonate was then removed by filtration and the alcohol was removed by distillation under reduced pressure. The residue was treated with 300 ml. of dry ether and the resulting solution was filtered to remove sodium bromide. The filtrate was dried and fractionally distilled under reduced pressure to obtain the desired N-methyl-N-propargylbenzylamine which boiled at 96–97° C. at 11 mm. pressure. Analysis calculated for $C_{11}H_{13}N$: C=82.97%; H=8.23%; N=8.80%. Found: C=82.71%; H=8.51%; N=8.93%. The hydrochloride salt of this amine was prepared by dissolving the amine in ether and adding ethereal hydrogen chloride to the ether solution. The solid hydrochloride salt which precipitated was recrystallized from an ethanol-ether mixture and was found to melt at 154–155° C.

The compounds prepared above were employed to inhibit monoamine oxidase as hereinafter described. In one test employing the in vivo method, groups of four mice each were orally administered various doses of aqueous solutions of the hydrochloride of N-methyl-N-propargylbenzylamine and N - propargylbenzylamine. Since one mouse stimulates its neighbors, the number of mice was carefully controlled. Routinely, four mice per dose were kept in a plastic box placed on end for the duration of the test. After four hours, some 200 mg./kg. of DOPA was administered intraperitoneally to each mouse and the activity of each mouse was constantly observed. The results are shown in the following table:

| Amine Hydrochloride Employed | Dosage in mg./kg. | Observed Response to DOPA in Hours | |
|---|---|---|---|
| | | 4 | 24 |
| N-propargylbenzylamine | 100 | 3 | 3 |
| | 200 | 3 | 3 |
| N-methyl-N-propargylbenzylamine | 50 | 2 | 2 |
| | 100 | 3 | 3 |

In this and the following test the observed response is defined as follows:

0 = no effect compared to normal mice given DOPA alone.
1 = minimal response such as piloerection and increased rate of respiration.
2 = definite response. Shaking the box causes great activity.
3 = marked response. Mice are very active and irritable.

In another test, various dosages of the same amine hydrochlorides employed in the preceding test were administered as aqueous saline solutions intraperitoneally to groups of four mice each and four hours later 200 mg./kg. of DOPA was administered intraperitoneally. The observed responses are tabulated in the following table:

| Amine Hydrochloride Employed | Dosage in mg./kg. | Observed Response to DOPA in Hours | |
|---|---|---|---|
| | | 4 | 24 |
| N-propargylbenzylamine | 50 | 1 | 1 |
| | 100 | 3 | 3 |
| | 200 | 3 | 3 |
| N-methyl-N-propargylbenzylamine | 5 | 3 | 3 |
| | 10 | 1 | 3 |
| | 20 | 3 | 3 |
| | 40 | 3 | 3 |

It is readily apparent from the above data that the DOPA response of two to three was present at 24 hours, thus showing a long duration of monoamine oxidase inhibition.

The compounds employed in this invention can be combined with solid or liquid pharmaceutical carriers and formulated into the form of tablets, lyophilized powders or capsules or dissolved or suspended in suitable solvents for oral or parenteral administration. The following examples describe methods for preparing tablets containing from 10 to 50 mg. of active ingredient.

EXAMPLE 3

*Formula for 115,000 Tablets*

Ingredient: Amount in grams

N-methyl-N-propargyl-benzylamine HCl __ 2,875.0
Corn starch _____ 1,127.0
Milk sugar _____ 11,172.2
Talc _____ 805.0
Magnesium stearate _____ 120.7
Distilled water _____ 2,254.0

Add 563.5 g. of corn starch plus an equal amount of milk sugar to the 2,875 g. of N-methyl-N-proparagyl-benzylamine. Add the balance of the milk sugar and pass the mixture through a 40 mesh screen. Make some hot starch paste using 563.5 g. of corn starch and all of the distilled water, granulate through a 4 mesh screen, dry the granulation at 50° C. for 18 hours and grind the dried granulation to 20 mesh. Add the talc and magnesium stearate to the dried granulation, pass through a 40 mesh screen and then blend the entire mixture with the corn starch-milk sugar-benzylamine mixture previously prepared. Compress into tablets using a ⁹⁄₃₂" punch so that each table weight is 140 mg. and contain 25 mg. of N-methyl-N-propargylbenzylamine hydrochloride.

EXAMPLE 4

*Formula for 50,000 Tablets*

Ingredient: Amount in grams

N-propargylbenzylamine HCl _____ 1,250.0
Corn starch _____ 481.0
Milk sugar _____ 5,299.0
Talc _____ 222.0
Magnesium stearate _____ 37.0
Stearic acid _____ 111.0
Distilled water _____ 1,000.0

Mix the above ingredients as described in Example 3 and compress into tablets weighing 148 mg. each of which contains 25 mg. of N-proparagylbenzylamine hydrochloride.

EXAMPLE 5

*Formula for 25,000 Tablets*

Ingredient: Amount in grams

N-propargylbenzylamine HCl _____ 625.0
Corn starch _____ 240.5
Dibasic calcium phosphate _____ 2,749.5
Talc _____ 111.0
Magnesium stearate _____ 18.5
Stearic acid _____ 55.5
Distilled water _____ 500.0

Mix all ingredients as previously described and compress into tablets weighing 148 mg. each of which contains 25 mg. of N-propargylbenzylamine hydrochloride.

EXAMPLE 6

*Formula for 100,000 Tablets*

Ingredient: Amount in grams

N-methyl-N-propargylbenzylamine HCl __ 5,000.0
Corn starch _____ 1,300.0
Milk sugar _____ 12,550.0
Talc _____ 1,000.0
Magnesium stearate _____ 150.0
Distilled water _____ 3,000.0

When the above ingredients are blended as described in Example 3 and compressed into tablets weighing 200 mg., each tablet contains 60 mg. of N-methyl-N-propargylbenzylamine hydrochloride.

EXAMPLE 7

*Formula for 115,000 Tablets*

Ingredient: Amount of grams

N-methyl-N-propargylbenzylamine HCl __ 1,150.0
Corn starch _____ 1,207.5
Milk sugar _____ 12,816.7
Talc _____ 805.0
Magnesium stearate _____ 120.7
Distilled water _____ 2,256.0

Blend the ingredients as previously described and compress into tablets weighing 140 mg. each of which contains 10 mg. of N-methyl-N-propargylbenzylamine hydrochloride.

EXAMPLE 8

Nine hypertensive human patients, ranging in age from 26 to 51 years, were each daily administered various dosages of N-methyl-N-propargylbenzylamine hydrochloride orally in tablet form (prepared as described in Example 4) for a period of three weeks. The orthostatic blood pressure of each patient before and after therapy was recorded daily. The average blood pressure of 20 measurements in a period of 5 days prior to therapy and at the peak of drug effect as well as the daily dosage of drug employed is shown in the following table.

| Patient No. | Daily Dosage of Drug in mg. | Average orthostatic blood pressure in mm. Hg | |
|---|---|---|---|
| | | Before Therapy | After Therapy |
| 1 | 37.5–75 | 224/151 | 130/93 |
| 2 | 50–75 | 148/107 | 117/81 |
| 3 | 75–100 | 292/126 | 136/93 |
| 4 | 50–100 | 158/119 | 106/80 |
| 5 | 50–75 | 181/123 | 118/84 |
| 6 | 50–125 | 156/121 | 138/108 |
| 7 | 50–125 | 188/149 | 129/106 |
| 8 | 50–75 | 211/149 | 148/108 |
| 9 | 25–75 | 148/120 | 124/98 |

It is to be observed that the decreases in blood pressure after therapy ranged from 18 to 96 mm. Hg in systolic pressure and from 13 to 58 mm. Hg in diastolic pressure. The onset for pronounced orthostatic effect varied from 7 to 20 days following the beginning administration of the drug and persisted at a discernible level for two weeks or more following cessation of therapy. All patients maintained a sense of well being in spite of the marked alterations in blood pressure.

Although the hydrochloride salts of the propargylamines were employed in the examples described, any pharmaceutically acceptable, non-toxic, acid-addition salt of these amines or the amines themselves may be substituted therefor. Suitable salts which may be employed include inorganic salts such as the hydrobromide, sulfate, phosphate and the like, or organic salts such as the picrate, succinate, citrate, tartrate, fumarate, oxalate, benzoate, salicylate, glycolate, nicotinate, ascorbate, maleate, lactate and the like. Such salts can be readily prepared by methods well known to those skilled in the chemical art. All such acid-addition salts of the amines employed in the method of the present invention are considered to be embraced within the scope of the present invention and to be equivalents of the amines themselves.

This application is a continuation of my copending application U.S. Serial No. 79,173, filed December 29, 1960, which in turn was a continuation-in-part of my copending application U.S. Serial No. 819,238, filed June 10, 1959, both of which have been abandoned.

I claim:
1. The method of inhibiting the action of monoamine oxidase in a warm blooded animal which comprises administering to said animal a non-toxic amount of a compound selected from the group consisting of N-methyl-N-propargylbenzylamine and its non-toxic, acid-addition salts sufficient to inhibit the action of monoamine oxidase.

2. The method of inhibiting the action of monoamine oxidase in a warm blooded animal which comprises orally administering in dosage form to said animal from 50 to 200 mg. of N-methyl-N-propargylbenzylamine per kilogram of body weight admixed with a pharmaceutically acceptable carrier.

3. The method of inhibiting the action of monoamine oxidase in a warm blooded animal which comprises orally administering in dosage form to said animal from 50 to 200 mg. of a non-toxic, acid-addition salt of N-methyl-N-propargylbenzylamine per kilogram of body weight admixed with a pharmaceutically acceptable carrier.

4. The method as claimed in claim 3 wherein the salt employed is the hydrochloride of N-methyl-N-propargylbenzylamine.

5. The method of inhibiting the action of monoamine oxidase in a warm blooded animal which comprises administering intraperitoneally in dosage form from 5 to 40 mg. of a non-toxic, acid-addition salt of N-methyl-N-propargylbenzylamine per kilogram of body weight admixed in aqueous saline solution.

6. The method as claimed in claim 5 wherein the salt employed is N-methyl-N-propargylbenzylamine hydrochloride.

7. The method of lowering blood pressure in a warm blooded animal which comprises administering to said animal a non-toxic amount of a compound selected from the group consisting of N-methyl-N-propargylbenzylamine and its non-toxic, acid-addition salts.

8. The method of lowering blood pressure in a warm blooded animal which comprises orally administering daily to said animal in tablet form from 25 to 100 mg. of N-methyl-N-propargylbenzylamine admixed with a pharmaceutically acceptable carrier.

References Cited in the file of this patent

Chemical Abstracts, vol. 20, page 390 (2), 1926.
Beilstein: Organische Chemie, vol. 12, II, page 548 (1950).